(12) United States Patent
Lu

(10) Patent No.: US 8,699,154 B2
(45) Date of Patent: Apr. 15, 2014

(54) CAMERA LENS ASSEMBLY AND PRODUCING METHOD THEREOF

(71) Applicant: Himax Technologies Limited, Tainan (TW)

(72) Inventor: Yin-Dong Lu, Tainan (TW)

(73) Assignee: Himax Technologies Limited, Tainan (TW)

( * ) Notice: Subject to any disclaimer, the term of this patent is extended or adjusted under 35 U.S.C. 154(b) by 0 days.

(21) Appl. No.: 13/901,033

(22) Filed: May 23, 2013

(65) Prior Publication Data

US 2013/0250444 A1   Sep. 26, 2013

Related U.S. Application Data

(63) Continuation of application No. 13/291,431, filed on Nov. 8, 2011, now Pat. No. 8,493,676.

(51) Int. Cl.
*G02B 7/02* (2006.01)

(52) U.S. Cl.
USPC ............................ 359/819; 359/821; 359/827

(58) Field of Classification Search
USPC .................................. 359/694–704, 811–830
See application file for complete search history.

(56) References Cited

U.S. PATENT DOCUMENTS

| 7,929,225 | B2 | 4/2011 | Sasaki |
| 8,025,450 | B2 | 9/2011 | Taki et al. |
| 8,493,676 | B2 * | 7/2013 | Lu ................... 359/819 |
| 2010/0110282 | A1 * | 5/2010 | Lan et al. .......... 348/374 |

* cited by examiner

*Primary Examiner* — Mohammed Hasan
(74) *Attorney, Agent, or Firm* — McClure, Qualey & Rodack, LLP

(57) ABSTRACT

A camera lens assembly is provided, including a holder, a lens module, and a metal frame. The lens module is fixed in the holder by an adhesive and includes a lens, a substrate connected to the lens, and a plurality solder balls disposed on the substrate. The metal frame is disposed around the lens module and fixed to the holder, wherein the metal frame forms an opening with the solder balls exposed thereto, and the lens module and the metal frame form a gap there between.

16 Claims, 9 Drawing Sheets

CAMERA LENS ASSEMBLY AND PRODUCING METHOD THEREOF

CROSS REFERENCE TO RELATED APPLICATIONS

This application is a Continuation of U.S. patent application Ser. No. 13/291,431, now U.S. Pat. No. 8,493,676, filed Nov. 8, 2011 and entitled "Camera lens assembly AND producing method THEREOF".

BACKGROUND OF THE INVENTION

1. Field of the Invention

This application relates in general to a camera lens assembly and in particular to a method for producing a camera lens assembly for a portable electronic device.

2. Description of the Related Art

Referring to FIG. 1, a conventional camera lens assembly for a portable electronic device usually comprises a holder 120 and a metal frame 130 fixed to the holder 120. A lens module is secured in the holder 120 and the metal frame 130 for capturing images. Specifically, the lens module has a substrate 112 with a plurality of solder balls 1121 disposed thereon. The substrate 112 and the solder balls 1121 are exposed to a cross shaped opening 132 of the metal frame 130 for SMT attachment to the PCB. However, since the metal frame 130 may contact the substrate 112 and the solder balls 1121 during assembly or the SMT process, short circuits between the metal frame 130 and the solder balls 1121 may occur and lead to failure of the camera lens assembly.

BRIEF SUMMARY OF INVENTION

An object of the application is to provide a camera lens assembly, including a holder, a lens module, and a metal frame. The lens module is fixed in the holder by an adhesive and includes a lens, a substrate connected to the lens, and a plurality solder balls disposed on the substrate. The metal frame is disposed around the lens module and fixed to the holder, wherein the metal frame forms an opening with the solder balls exposed thereto, and the lens module and the metal frame form a gap therebetween.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
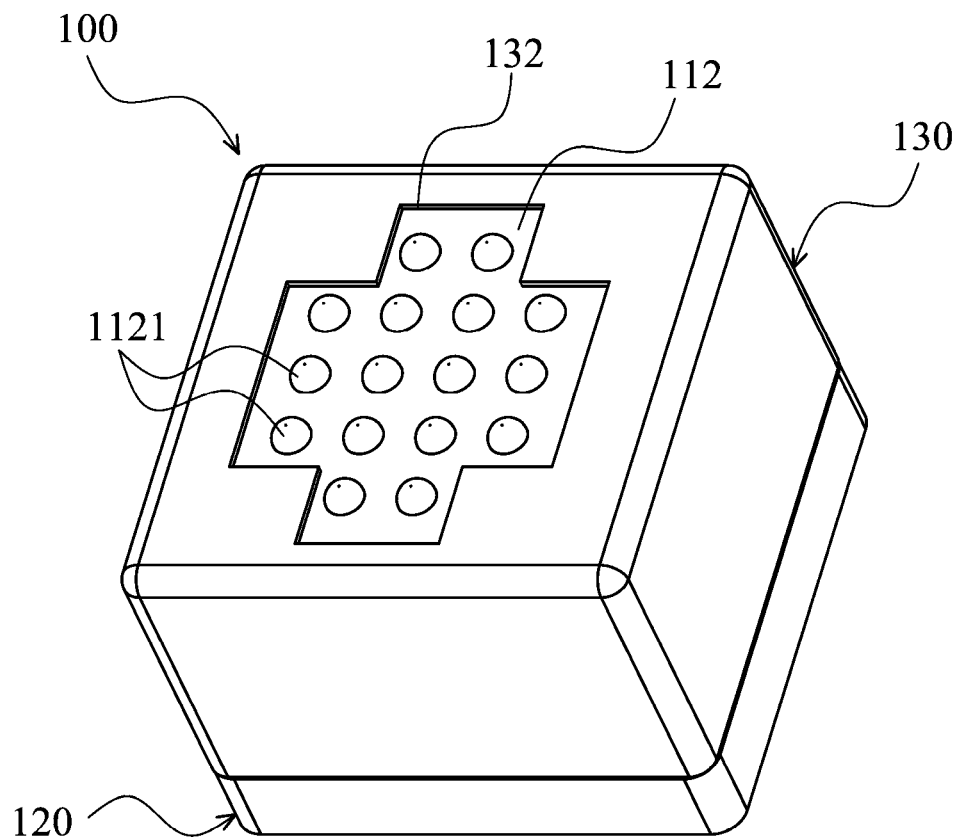
FIG. 1 is a perspective diagram of a conventional camera lens assembly.
Figure 2A:
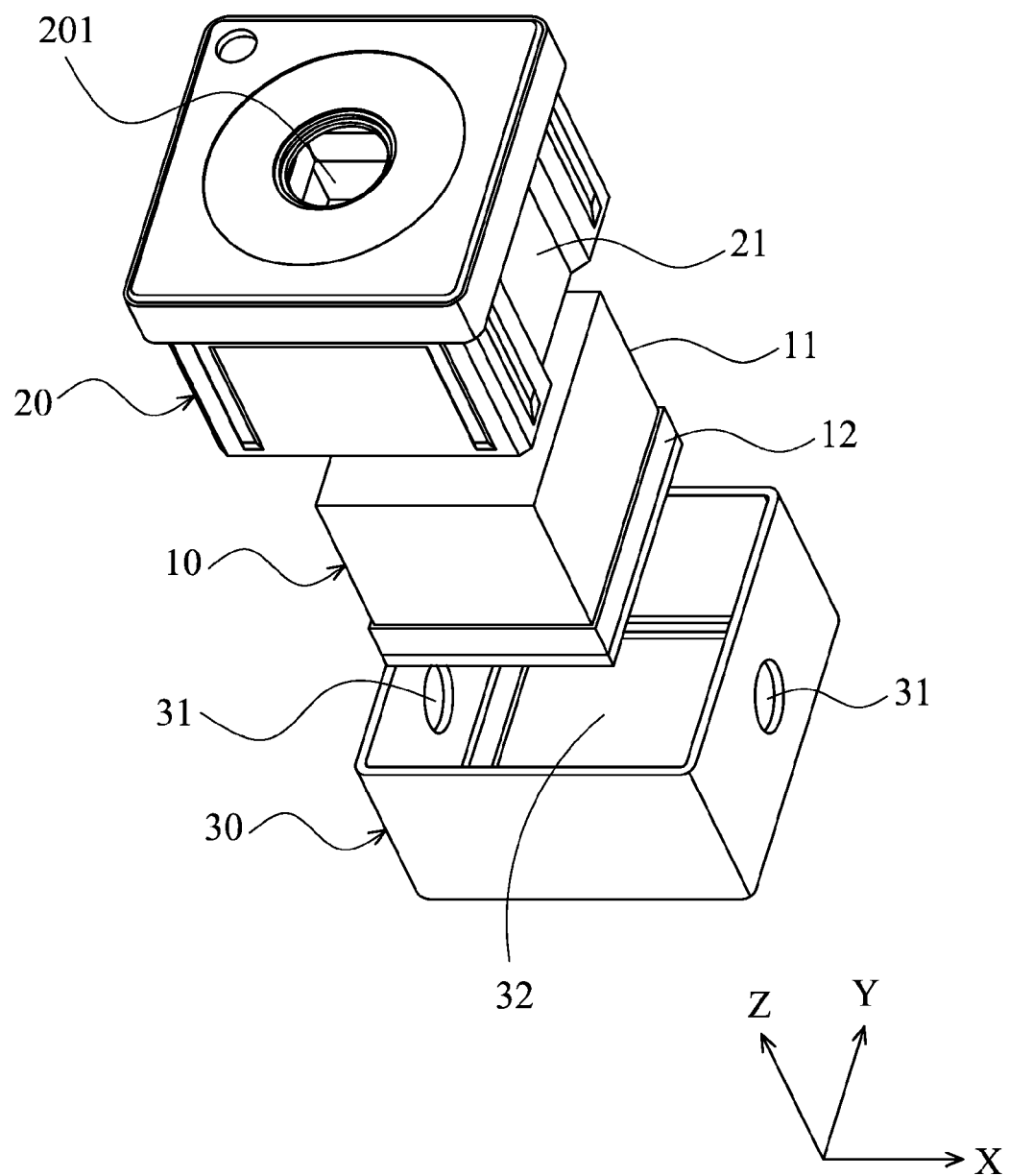
FIGS. 2A and 2B are perspective diagrams of a camera lens assembly according to an embodiment of the invention.
Figure 2B:
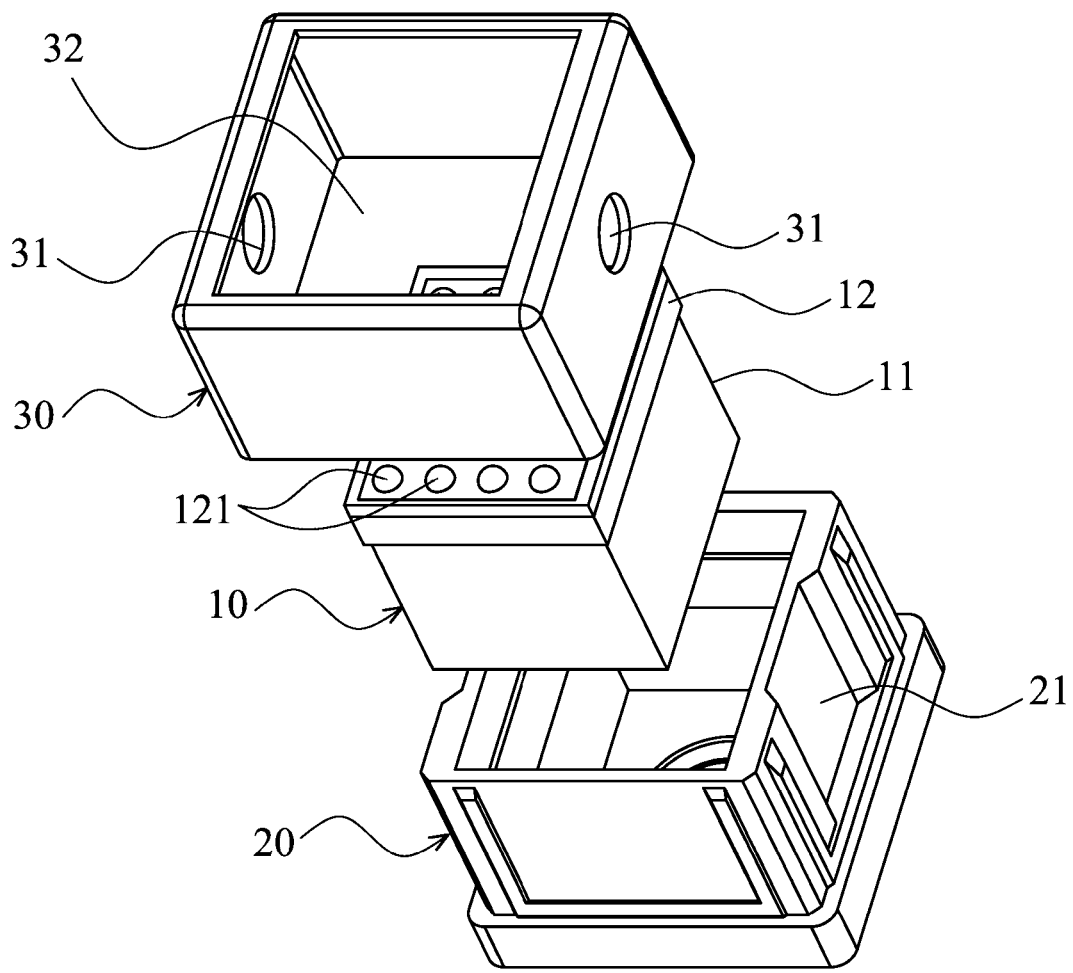

Referring to FIGS. 2A and 2B, an embodiment of a camera lens assembly primarily comprises a lens module 10, a holder 20, and a metal frame 30. The lens module 10 comprises a lens 11, a substrate 12 connected to the lens 11, and a plurality solder balls 121 disposed on the substrate 12 for SMT mounting to a PCB, wherein the solder balls 121 are arranged in a matrix. As shown in FIG. 2A, the holder 20 comprises a window 201 at a center thereof, corresponding to the lens module 10. Light can enters the camera lens assembly through the window 201. The metal frame 30 is disposed around the lens module 10 and fixed to the holder 20. In this embodiment, the metal frame 30 forms two holes 31 on opposite sides thereof and an opening 32 with the solder balls 121 exposed thereto.

Figure 3A:
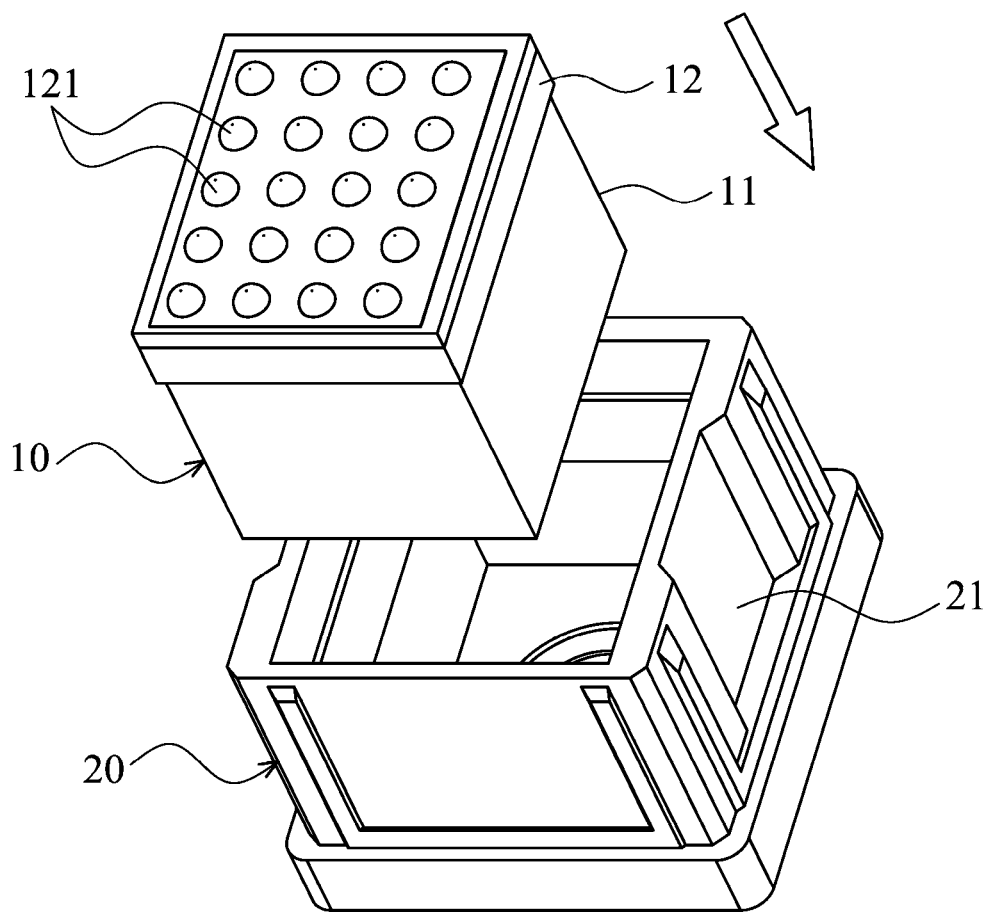
FIGS. 3A and 3B are perspective diagrams of a lens module disposed into a holder according to an embodiment of the invention.
Figure 3B:
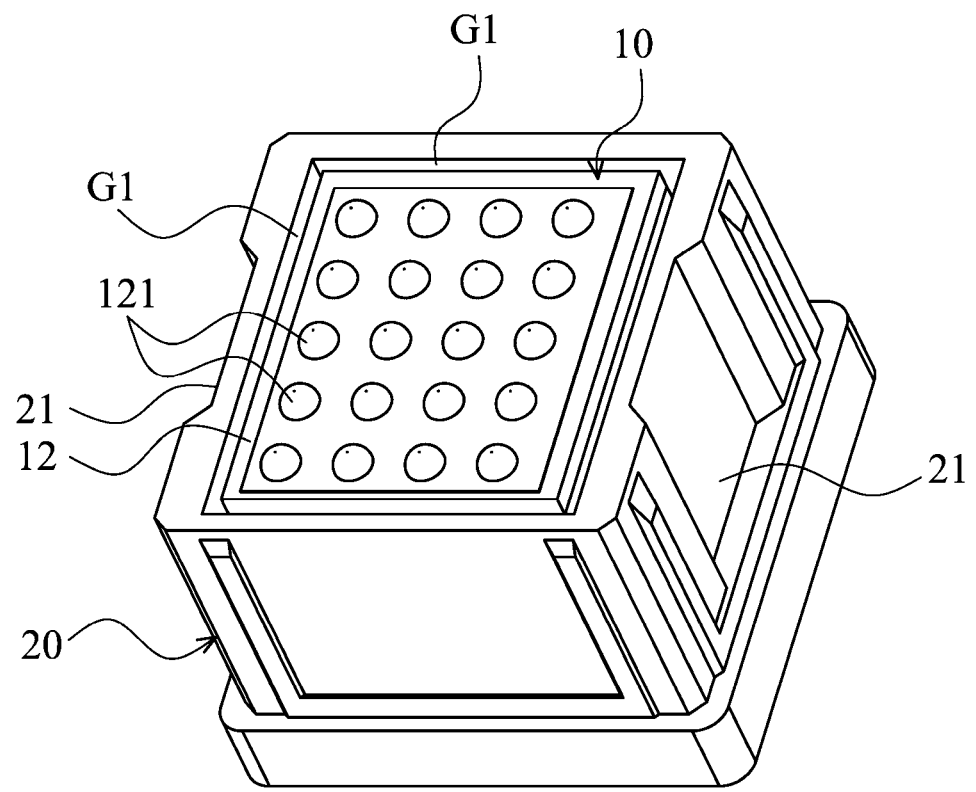
Figure 4:
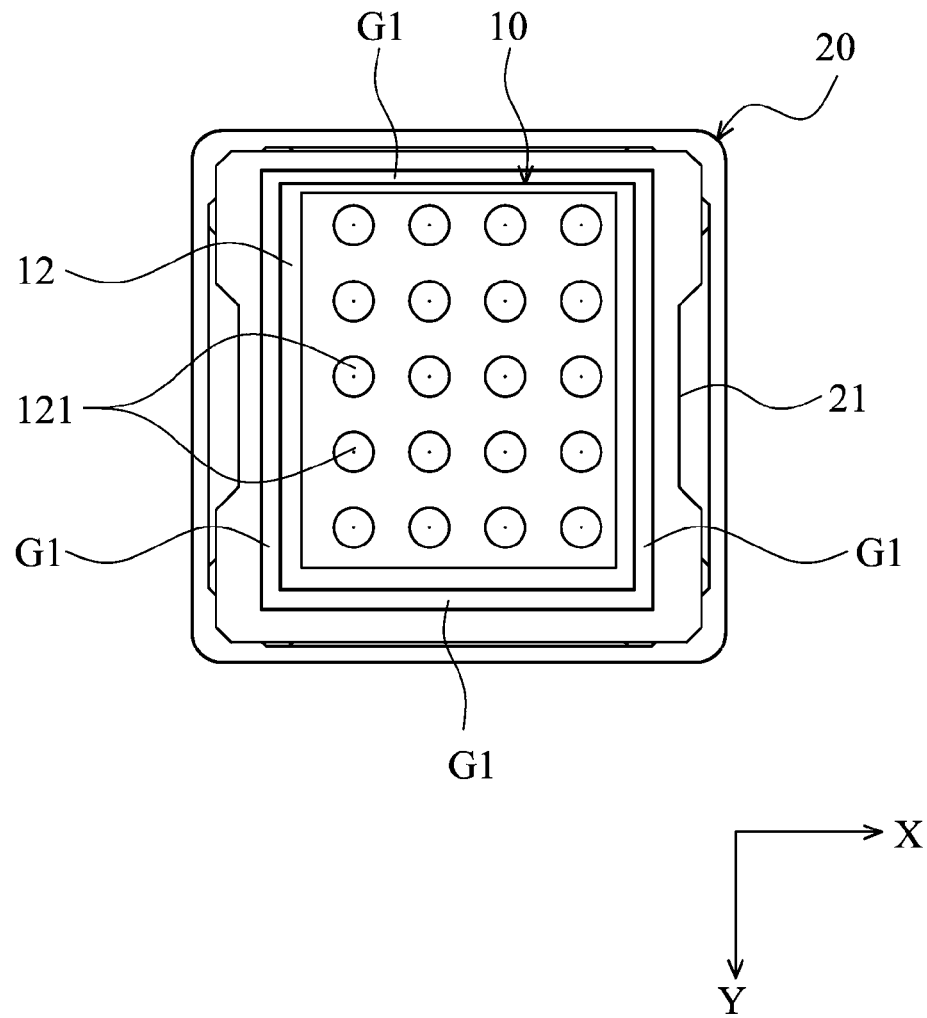
FIG. 4 is a top view the lens module and the holder in FIGS. 3A and 3B.

During assembly, the lens module 10 is disposed into the holder 20, as the arrow shows in FIG. 3A. When the lens module 10 is seated in the holder 20, a groove G1 is formed between the lens module 10 and the holder 20, as shown in FIGS. 3B and 4. In this embodiment, the groove G1 is rectangular and surrounds the lens module 10. Subsequently, an adhesive such as UV or Epoxy glue can be applied to the groove G1 for securing the lens module 10 in the holder 20.

Figure 5:
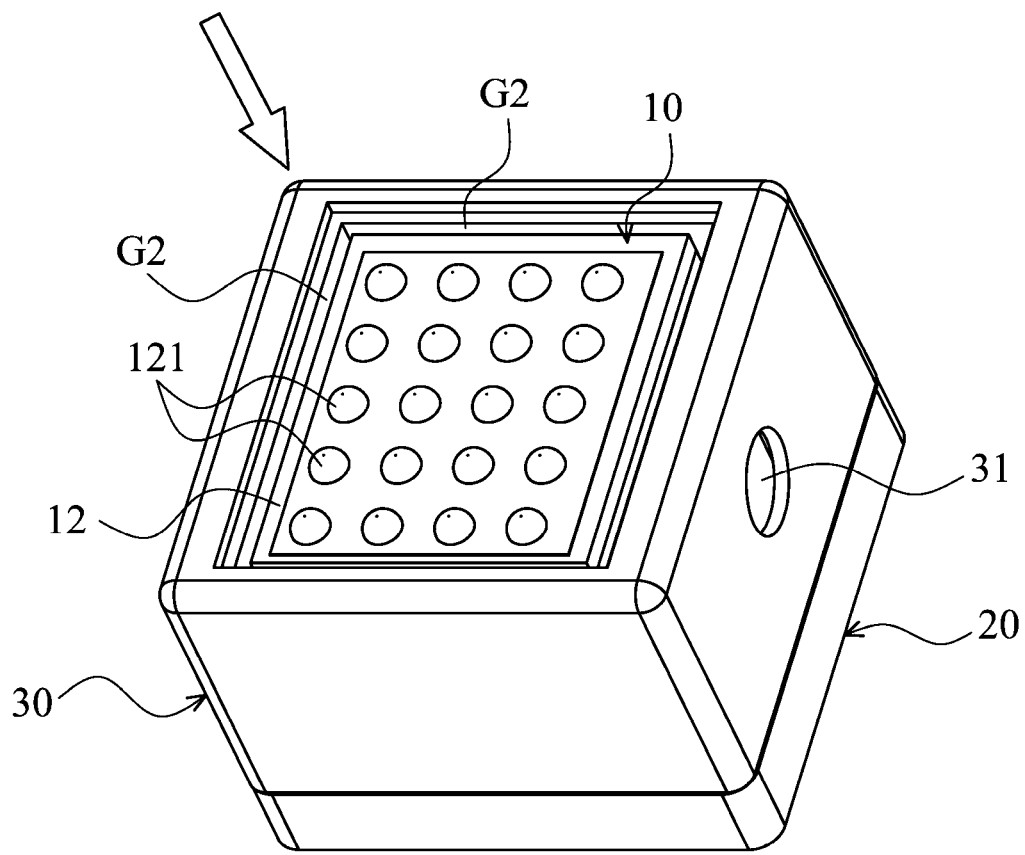
FIG. 5 is perspective diagram of a metal frame assembled to a holder.

After applying the adhesive to the groove G1, the metal frame 30 can be assembled to the holder 20 to protect the lens module 10, as shown in FIG. 5. In this embodiment, the metal frame 30 and the lens module 10 form a gap G2 therebetween, wherein the gap G2 surrounds the lens module 10 and communicates with the groove G1. Thus, the metal frame 30 can be electrically insulated from the lens module 10 by the gap G2. With the adhesive applied to the groove G1, the excessive adhesive may flow over the holder 20 to an outer surface thereof, and the metal frame 30 and the holder 20 can be fixed to each other by the adhesive. In practice, the adhesive may only need to be applied once during assembly for connecting the lens module 10, the holder 20, and the metal frame 30. Thus, assembly process can be simplified to save production cost. In some embodiments, the holder 20 can also be press-fitted into the metal frame 30, so as to protect the lens module 10.

Figure 6:
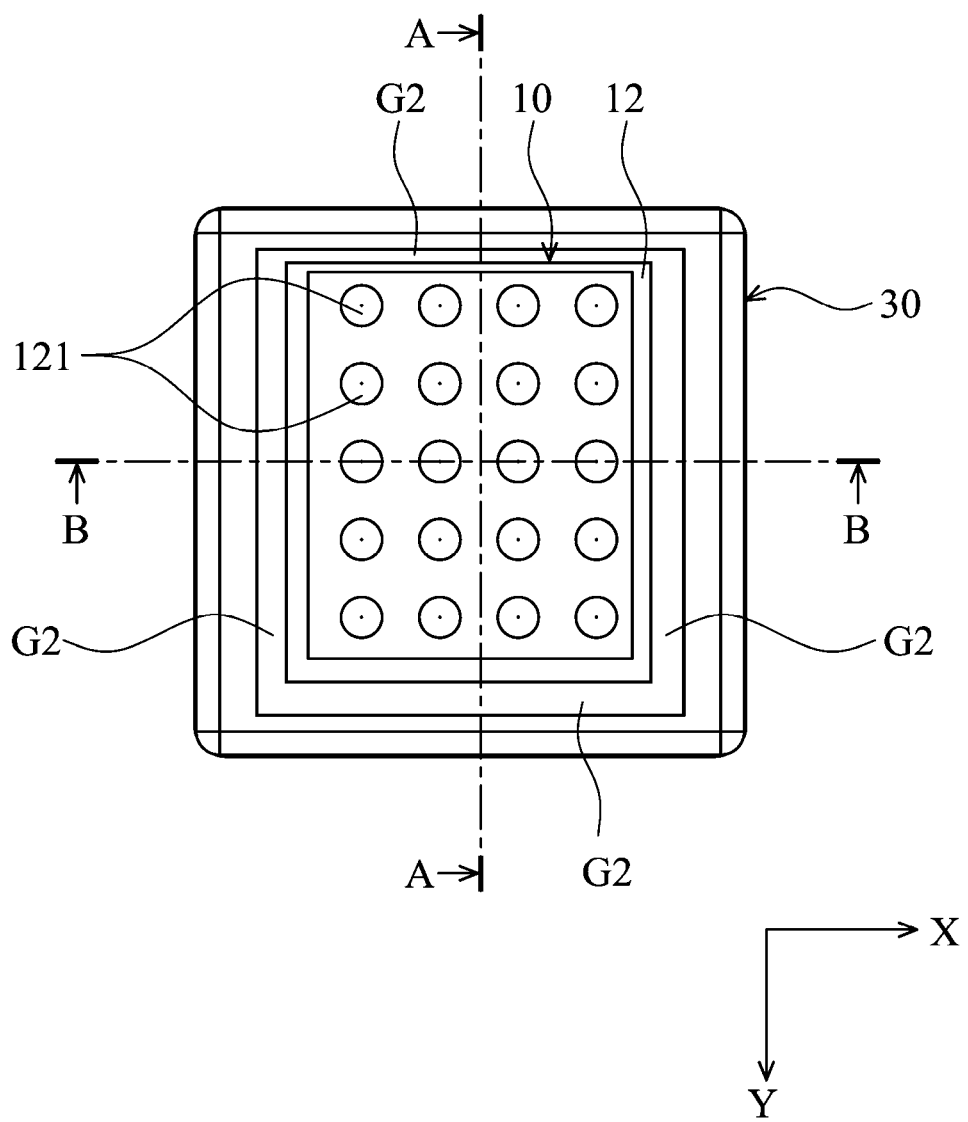
FIG. 6 is a top view of the camera lens assembly in FIG. 5.
Figure 7:
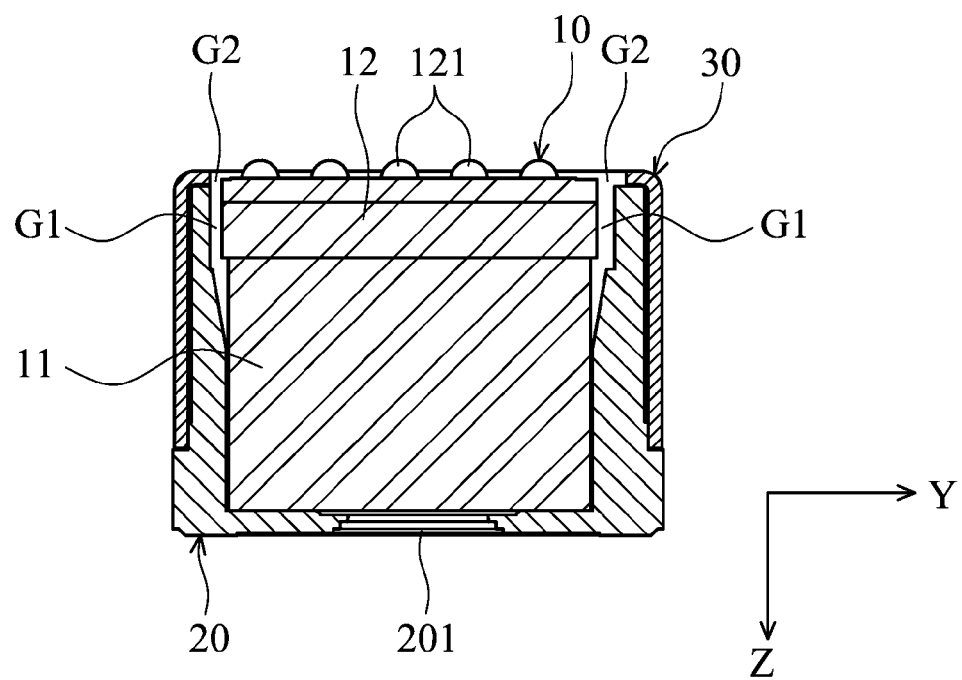
FIG. 7 is a sectional view along lines A-A in FIG. 6.
Figure 8:
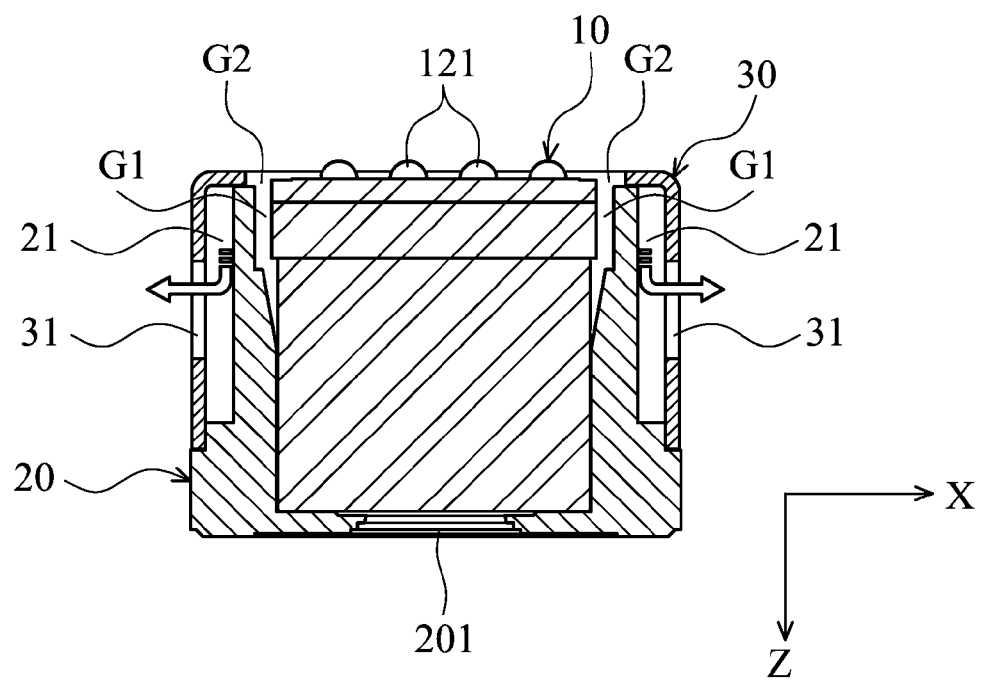
FIG. 8 is a sectional view along lines B-B in FIG. 6.

FIGS. 7 and 8 are sectional views respectively along lines A-A and B-B in FIG. 6. As shown in FIGS. 7 and 8, the groove G1 and the gap G2 surround the lens module 10 and communicate with each other. Since the holder 20 is made of insulating material such as plastic, the metal frame 30 can be electrically insulated from the lens module 10. It is further noted that the excessive adhesive may flow over the holder 20 to the recesses 21 on the outer surfaces of the holder 20, as shown in FIGS. 2A, 2B and 8. The recesses 21 can receive and guide the adhesive to the holes 32 on the lateral sides of the metal frame 30, and the excessive adhesive can be released through the holes 32.

Figure 3B:
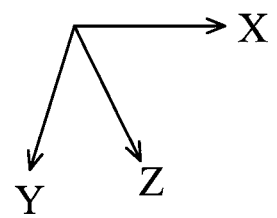

According to FIGS. 2A-8, the invention further provides a method for producing a camera lens assembly. The first step is to dispose a lens module 10 in a holder 20, wherein the lens module 10 and the holder 20 form a groove G1 therebetween, as shown in FIGS. 3A-4. It is noted that an adhesive may be applied to fix the lens module 10 in the holder 20. Subsequently, a metal frame 30 is fixed to the holder 20, wherein the metal frame 30 forms an opening 32 with the lens module 10 exposed thereto, as shown in FIGS. 2A-2B. In some embodiments, the lens module 10 and the metal frame 30 form a gap G2 therebetween, as shown in FIGS. 5-6, such that the metal frame 30 can be electrically insulated from the lens module 10.

While the invention has been described by way of example and in terms of preferred embodiment, it is to be understood that the invention is not limited thereto. To the contrary, it is intended to cover various modifications and similar arrangements (as would be apparent to those skilled in the art).

Therefore, the scope of the appended claims should be accorded the broadest interpretation to encompass all such modifications and similar arrangements.

What is claimed is:

1. A camera lens assembly, comprising:
   a holder;
   a lens module, fixed in the holder by an adhesive, comprising a lens, a substrate connected to the lens, and a plurality solder balls disposed on the substrate; and
   a metal frame, disposed around the lens module and fixed to the holder, wherein the metal frame forms an opening with the solder balls exposed thereto, and the lens module and the metal frame form a gap therebetween.

2. The camera lens assembly as claimed in claim 1, wherein the lens module and the holder form a groove therebetween, and the adhesive is disposed in the groove for fixing the lens module to the holder.

3. The camera lens assembly as claimed in claim 2, wherein the gap communicates with the groove and surrounds the lens module.

4. The camera lens assembly as claimed in claim 3, wherein the adhesive flows from the groove to an outer surface of the holder, and the metal frame is fixed to the holder by the adhesive.

5. The camera lens assembly as claimed in claim 1, wherein the metal frame is electrically insulated from the lens module by the gap, and the holder is press-fitted into the metal frame.

6. The camera lens assembly as claimed in claim 1, wherein the holder comprises a window at a center thereof, corresponding to the lens module.

7. The camera lens assembly as claimed in claim 1, wherein the solder balls are arranged in a matrix.

8. The camera lens assembly as claimed in claim 1, wherein the adhesive comprises UV or Epoxy glue.

9. A method for producing a camera lens assembly, comprising:
   providing a lens module and a holder;
   disposing the lens module in the holder;
   applying an adhesive to fix the lens module in the holder; and
   providing a metal frame and fixing the metal frame to the holder, wherein the metal frame forms an opening with the lens module exposed thereto, and the lens module and the metal frame form a gap therebetween.

10. The method as claimed in claim 9, wherein the lens module and the holder form a groove therebetween, and the adhesive is disposed in the groove for fixing the lens module to the holder.

11. The method as claimed in claim 10, wherein the gap communicates with the groove and surrounds the lens module.

12. The method as claimed in claim 11, wherein the adhesive flows from the groove to the outer surface of the holder, and the metal frame is fixed to the holder by the adhesive.

13. The method as claimed in claim 9, wherein the metal frame is electrically insulated from the lens module by the gap, and the holder is press-fitted into the metal frame.

14. The method as claimed in claim 9, wherein the holder comprises a window at a center thereof, corresponding to the lens module.

15. The method as claimed in claim 9, wherein the solder balls are arranged in a matrix.

16. The method as claimed in claim 9, wherein the adhesive comprises UV or Epoxy glue.

* * * * *